(12) United States Patent
Sigel et al.

(10) Patent No.: US 7,636,171 B1
(45) Date of Patent: Dec. 22, 2009

(54) STORAGE MEDIA MONITORING METHOD FOR ARCHIVE MANAGEMENT

(75) Inventors: Christophe N. Sigel, Broomfield, CO (US); Michael L. Leonhardt, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 675 days.

(21) Appl. No.: 11/409,781

(22) Filed: Apr. 24, 2006

(51) Int. Cl.
*G01B 11/14* (2006.01)

(52) U.S. Cl. .................. 356/625; 356/237.1; 356/623; 356/636; 359/7; 359/11; 359/28; 369/112.01; 369/53.21

(58) Field of Classification Search ... 356/237.1–237.5, 356/625, 630–636; 369/112.01, 102, 103, 369/53.2, 53.21, 44.11–44.27; 359/7, 10, 359/11, 20–28
See application file for complete search history.

(56) References Cited

U.S. PATENT DOCUMENTS 7,295,356 B2 * 11/2007 King ........................... 359/11
2006/0104172 A1 * 5/2006 Grampel et al. ........ 369/112.01

* cited by examiner

*Primary Examiner*—Gregory J Toatley, Jr.
*Assistant Examiner*—Iyabo S Alli
(74) *Attorney, Agent, or Firm*—Brooks Kushman P.C.

(57) ABSTRACT

A method is provided for monitoring degradation of a data storage medium. Multiple reactive elements are provided in the data storage medium. Properties of each one of these elements is determined, prior or subsequent to data being stored in the medium, to generate a baseline map of the medium. Updated properties of at least one of the elements are determined in order to generate an updated map of the medium. A determination can then be made as to whether degradation of the medium has occurred by comparing the baseline map to the updated map.

20 Claims, 6 Drawing Sheets

STORAGE MEDIA MONITORING METHOD FOR ARCHIVE MANAGEMENT

BACKGROUND OF THE INVENTION

1. Field of the Invention

The present invention relates generally to storage devices in data processing systems for storing data. Still more particularly, the present invention relates to monitoring a current state of degradation of storage media for managing a data archive.

2. Description of the Related Art

Effective data archiving requires long lifetime media. Media degradation can result from multiple factors: physical wear associated with data transfer mechanisms requiring direct physical contact between data storage device and media such as in tape; media intrinsic degradation mechanisms, such as diffusion, chemical decomposition of functional constituents; manufacturing defects that occurred during the manufacturing of the media; and external environmental factors, such as temperature or relative humidity. The effect of any of these factors on the media's "health" can be very complex and difficult to predict.

Today, media "health" is primarily monitored by reading back the stored data and watching for an increase in error rate that occurs in response to some physical change in the media. As bit error rate (BER) is to some degree a measure of data integrity and its increase a measure of a degradation effect that has already occurred, this may not always provide early enough warning to migrate the data from degraded media in order to prevent loss. Furthermore, as data ages, frequency of access (or intervals between successive data readout operations) decreases (increases), thus limiting the effectiveness of BER monitoring for preventing data loss.

Optical media have been shown to be capable of very long lifetimes given proper handling and controlled storage conditions.

One form of optical data storage is holographic data storage. One major obstacle to its commercial development for many years was the absence of a suitable storage medium. Low-cost, photopolymer-based holographic data storage media having the requisite properties for high density storage have recently been introduced. Among these properties, a key property for high density storage and retrieval is the dimensional stability of the medium with respect to the recording process. Holographic storage media lifetimes are predicted to be 50-100 years, based on initial results from highly accelerated lifetimes. Accordingly, holographic data storage products are considered as a viable alternative for archive data storage.

Holographic recording is achieved by illuminating a photosensitive medium with intersecting reference and object light beams. The spatial modulation of light intensity produced by interference of the beams is recorded in a holographic data storage medium by modification of the dielectric properties of the medium, either in the form of periodic spatial modulation of the refractive index of the medium or of the absorption of the medium, to constitute a grating or a hologram.

One implementation of holographic data storage comprises volumetric digital page holographic storage which allows a large amount of data to be recorded in parallel in the form of a 2-dimensional bit array or data page. This is accomplished by placing a spatial light modulator in the optical path of the object light beam. The spatial light modulator imparts a data page on the object light beam by modulating the spatial profile of the object beam. Each stored data page typically comprises thousands to millions of data bits which are written and read in a single step.

In a high density data storage scheme, the object beam is focused by a focusing lens within the recording medium and recorded as a volume hologram. Volumetric holographic data storage processes, commonly designated as "multiplexing", can achieve high storage density by recording a large number of page holograms within the same area of the data storage medium. The multiplexing can be achieved by various methods, one of which is angle multiplexing, in which the angle of incidence of the reference beam is changed between successive hologram recordings. By illuminating the holographic data storage medium with an appropriate reference beam, a single associated data page stored in the data storage medium can be reconstructed.

Figure 1:
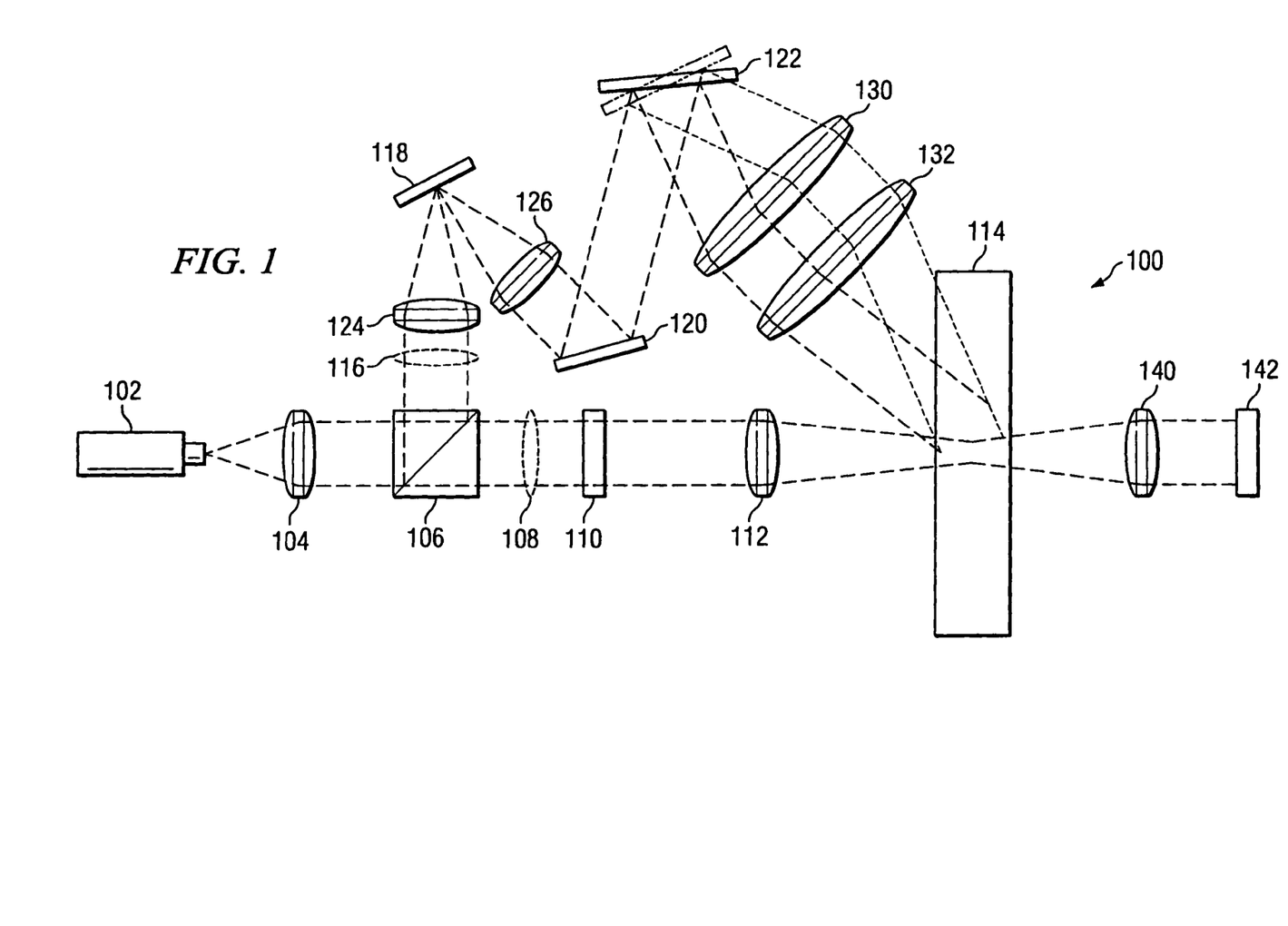
FIG. 1 is a schematic diagram of a known holographic data storage and retrieval system.

FIG. 1 schematically illustrates a known holographic data storage and retrieval system to assist in explaining the present invention. The system is generally designated by reference number 100 and includes a single laser source 102. Light from laser source 102 is collimated by collimating lens 104, and the collimated light beam from lens 104 is split into two light beams by a polarizing beam splitter (PBS) 106.

Object beam 108 transmitted by polarizing beam splitter 106 impinges on spatial light modulator (SLM) 110, comprising a 2-Dimensional pixel array, which inscribes a data page on object beam 108 by amplitude modulation of the spatial profile of the object beam. Lens 112 focuses the modulated object beam inside holographic data storage medium 114.

Reference beam 116 reflected by PBS 106 is directed by mirrors 118 and 120 onto scanning mirror 122. Lenses 124 and 126 function as a telescope to adjust the size of the reference beam. Scanning mirror 122 deflects the reference beam which then passes through a lens system comprised of lenses 130 and 132. Lenses 130 and 132 keep the reference beam incident on the same location of holographic data storage medium 114 as object beam 108 but with a different angle of incidence determined by the deflection angle of scanning mirror 122.

As shown in FIG. 1, data is recorded in holographic data storage medium 114 as a Fourier hologram. Upon readout of a holographically stored data page by a reference beam with an appropriate angle of incidence, the spatially modulated object beam is reconstructed and collimator 140 directs and forms an image of the retrieved data page upon a 2-dimensional photodetector array 142.

Dimensional stability of the storage medium is critical for data readout. Photopolymer material is known to be sensitive to environmental changes; in particular, it may experience swelling due to moisture absorption. Accordingly, efficient environmental sealing of the photopolymer recording layer is essential for preserving data integrity and readability.

For the most effective management of a long term media library, in order to minimize data loss and reduce the overall cost of ownership of the stored data, it would be desirable to have a method of monitoring the precursors to the media's actual functional degradation. Such a method is especially needed by photopolymer holographic media where the dimension stability of the media is critical to data reading and the media is subject to "swelling" due to moisture absorption.

Other conventional optical media types, such as multi-layered, blue laser-based optical media would also benefit from such a method.

SUMMARY OF THE INVENTION

Methods and apparatus are provided for monitoring degradation of a data storage medium. Methods and processes are described for providing a data storage medium comprising a plurality of data recording elements and a plurality of monitoring elements. The plurality of monitor elements are preferably arranged within one or more regions, a portion of which at least completely contains or completely surrounds the at least one or more regions containing the plurality of data recording elements. Monitoring method comprises a first measurement of one or more selectable properties of each one of the plurality of monitoring elements for generating and storing a map of an initial state of the medium; at least one second measurement is performed at least one subsequent point in time for generating and storing a map of at least one intermediate state of the data storage medium. After each second measurement, a determination is made as to whether any localized change of the medium has occurred by comparing the map of the intermediate state to the map of the initial state. Monitoring method is applicable to monitoring the state of unwritten data storage medium, as well as that of data storage medium containing recorded data.

Monitoring method comprises a non-destructive method which selectively detects the state of monitor elements, by a measurement of one of their physical properties, preferably using optical means.

Data recording elements and monitor elements may be different elements such that their respective functional properties and detectable states are independent of the presence or state of the other, and accessed through different independent mechanisms.

Monitor elements preferably comprise one or more different elements reactive to the presence of at least one of at least one different contaminant resulting from external environment contamination and of the one or more products of intrinsic degradation mechanisms of one or more functional elements of the data storage medium.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention comprises a method for monitoring the degradation of a data storage medium over time. Multiple monitoring elements are embedded in the data storage medium before data is stored in the medium. These monitoring elements may comprise elements different from recording elements that react in the presence of some local contaminant, or embedded patterns within the medium that can be used to detect dimensional changes in the medium. Embedded patterns may comprise gratings, such as reflective gratings.

In a first measurement, properties of each one of these elements are determined to generate a map of an initial state of the medium, herein also termed baseline map of the medium. The baseline map comprises information about initial parameter value for each element as well as its location in the medium. In at least one subsequent measurement, current parameter value for each element as well as its current location in the medium is determined in order to generate a map of a current state of the medium. A determination can then be made as to whether local or global degradation of the medium has occurred by comparing the baseline map to the current map of the medium.

The first and the at least one subsequent measurement may occur at any time prior to or after data recording to the medium.

As set forth above, embedding monitor elements, also called reference elements herein, in a medium and then detecting changes in the properties of these elements provides a method for measuring local changes in the medium. The reference elements can be used to establish a dimensional and/or contamination baseline map for the particular medium. Each monitoring element provides a local fiduciary element for monitoring the local state of the storage media. The reference elements embedded in the particular medium each have an initial or baseline state associated with a particular property being measured. The set of baseline states forms a map of the initial state or baseline of the medium which is stored as metadata. The information about the media's state pertaining to each storage media may be stored on or separate from the particular storage medium, but preferably both on and off the particular medium. In subsequent use of the particular medium, the reference elements can be checked to determine a new state of each one of the reference elements. The baseline state is then compared to the new state for each one of the reference elements.

After further use of the particular medium, the reference elements can be checked again to determine a second state for each one of the reference elements. In this manner, trends over time can be evaluated by evaluating how the state of each reference element changes over time. These comparisons can be used for early detection of degradation trends.

The reference elements can be implemented in a variety of ways depending upon the particular media type and the targeted media characteristic that is to be detected. For example, the reference elements can be substantially independent from the host medium which means that the reference elements do not interact, chemically or otherwise, in their initial or any of subsequent states, with the host medium and its properties. Alternatively, the reference elements can form a part of the host medium structure, such as, in the case of photopolymer, a chromophore that is chemically bonded to a polymer host matrix, as long as the detectable modification that the reference element undergoes does not modify the primary functional property of the medium.

The embedded reference elements may comprise a species comprised in the composition of the medium and different from the species giving the medium its functional properties.

In organic and inorganic optical media, a first preferred embodiment of the process of the present invention consists of homogeneously doping or locally doping the medium by a different and separable element from the one or more elements implementing the data recording functionality. Locally doping the medium may comprise only doping a layer of the medium, or creating a spatial distribution of dopants in the medium. The spatial distribution may comprise a three dimensional pattern within the medium. An example of suitable dopants comprises organic dye molecules or nanoparticles that present optical properties sensitive to the local environment and can be used as optical (using fluorescence or other suitable properties) sensors, outside of the functional optical spectrum of the medium.

A medium with embedded reference elements may also be implemented by locally modifying an existing modifiable and measurable property of the medium to induce a spatially localized and detectable difference in its properties, such that these localized variations form fiducial marks.

A second preferred embodiment of the present invention provides for photo-writing spatial patterns within the medium, which may be used both for monitoring the dimensional changes of the medium as well as for creating servo marks in the medium.

In an alternate embodiment of the present invention, the storage medium may comprise a recording layer and also at least one substrate layer. The recording layer may be deposited on the substrate layer or sandwiched between two substrate layers, which may act to environmentally isolate the medium and/or provide mechanical stability.

The method of the illustrative embodiment can be utilized to track degradation and trends over time of other types of media.

In the first preferred embodiment, the composition of photopolymer media for holographic data storage may include an additional species, separate and independent of either the host matrix or the photo-polymerizable monomer, and suitable initiators, for providing targets with detectable optical properties and optically sensitive to local environment changes (dimensional changes). In the second embodiment, the elements may consist of reflective holograms directly written in and suitably disposed within the volume of the medium. These are preferably oriented orthogonally to the surface of the medium and, as such, display high sensitivity to longitudinal (e.g. thickness) dimensional changes in the medium.

Once integrated within the medium, the embedded elements can be used for monitoring in-situ the state of the medium through the manufacturing process, for monitoring media stability during any "burn in" test, as well as for routine measurement of the state of medium during its operational use and determination of its lifetime.

Figure 2A:
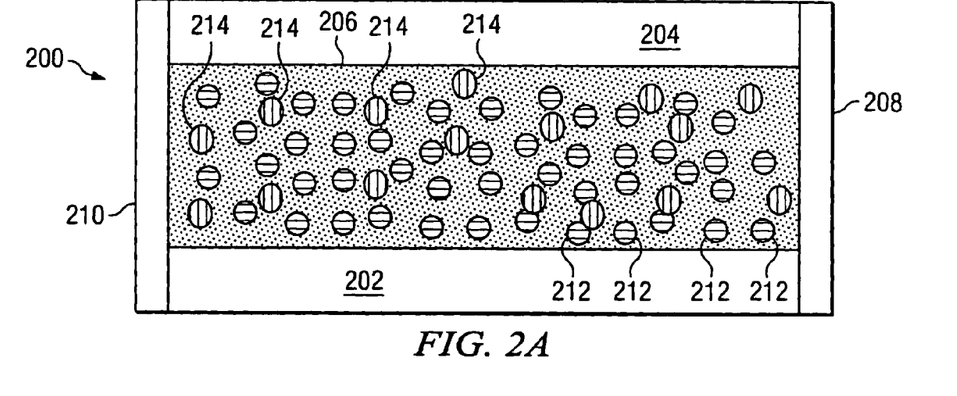
FIG. 2A is a cross-sectional view of a photopolymer holographic medium that includes embedded monitor elements, prior to storing data in the medium, in accordance with a first embodiment of the present invention.

FIG. 2A is a cross-sectional view of a photopolymer-based holographic storage medium that includes embedded reference elements, prior to storing data in the medium, in accordance with a first embodiment of the present invention. A holographic storage medium 200 includes a first substrate 202, a second substrate 204, holographic recording material 206, and edge seals 208, 210. First substrate 202 and second substrate 204 are preferably formed from a polycarbonate or glass.

Holographic recording material 206 is sandwiched between first substrate 202 and second substrate 204. Edges 208, 210 act to seal holographic material 206 within first substrate 202 and second substrate 204. Edges 208, 210 are depicted as separate elements, but may comprise a single seal formed around the periphery of holographic storage medium 200.

Holographic recording material 206 preferably comprises a photopolymer compound, comprising at least a host matrix consisting of a cross-linked polymer (represented herein by the grid-like background) and a photoactive monomer 212. In the depicted example, the photoactive monomer may comprise one of a blue, green, and red sensitive monomer and is responsible for recording data. Before a holographic image is written to holographic recording material 206, the plurality of photoactive monomer elements 212 are homogeneously distributed within holographic recording material 206. Holographic recording material 206 may also comprise suitable additional elements such as inhibitors and initiators, which act to promote or play an intermediary role in the holographic material functional properties.

According to the invention, holographic recording material 206 may additionally comprise a plurality of reference elements 214, herein also called monitor agents, which are homogeneously distributed within holographic recording material 206. Monitor agents 214 may be sensitive to changes in their local environment; for example, they may react or otherwise exhibit changes in their properties in response to the presence of one or more contaminants. Contaminants may be the result of external environmental contamination and may comprise elements such as moisture, oxygen, or any other elements having a permanent or temporary degrading effect on the medium's functionality. Contaminants may also comprise the products of internal transformations occurring within the medium.

In another example, monitor agents 214 may be sensitive to local dimensional changes or deformations occurring in the medium.

Agents 214 are chosen so that the reaction is detectable by measuring one of the parameters, such as one of the optical properties, of an agent. Any change in one of these parameters in one or more monitor agents indicates a local change in the environment which may result from the presence of some type of contaminant, or of an internal reaction occurring within holographic recording material 206, which could eventually lead to degradation of holographic recording material 206.

Suitable optical properties that can be measured include absorption or fluorescence properties of the monitor agents. Changes in the monitor agent's state may result, for example, in a change in the strength and wavelength of absorption and/or fluorescence emission of the monitor agent. Changes in the optical properties of monitor agents can then be detected as variations in resulting signal intensity.

In one example, a system suitable for measuring absorption property of monitor agents may comprise a light emitting diode (or a single wavelength laser diode) with its wavelength substantially proximate to the absorption peak of the monitor agent and a detector.

In another example, a system for measuring fluorescence of monitor agent may comprise a light emitting diode (or a single wavelength laser diode) with its wavelength substantially proximate to the absorption peak of the monitor agent, collimating optics, and a detector combined with a narrowband wavelength filter centered at the peak wavelength of the fluorescence.

Monitor agents 214 may be distributed throughout holographic recording material 206 or localized within one or more specific regions. For example, agents 214 may be localized within a periphery, or upon a surface, of holographic recording material 206.

FIG. 2A illustrates monitor agents 214 being distributed throughout holographic recording material 206.

In an alternate embodiment, monitor agents 214 may be distributed around the periphery of and external to holographic recording material 206, or may be distributed within edges 208 and 210 and within first and second substrates 202 and 204.

The parameters of each one of monitor agents 214, prior to data being stored and at a first point in time, provide a baseline map of the state of holographic storage medium 200. In the future, degradation of holographic storage medium 200 can be evaluated by comparing the baseline map with the future values of parameters of each one of the agents.

Figure 2B:
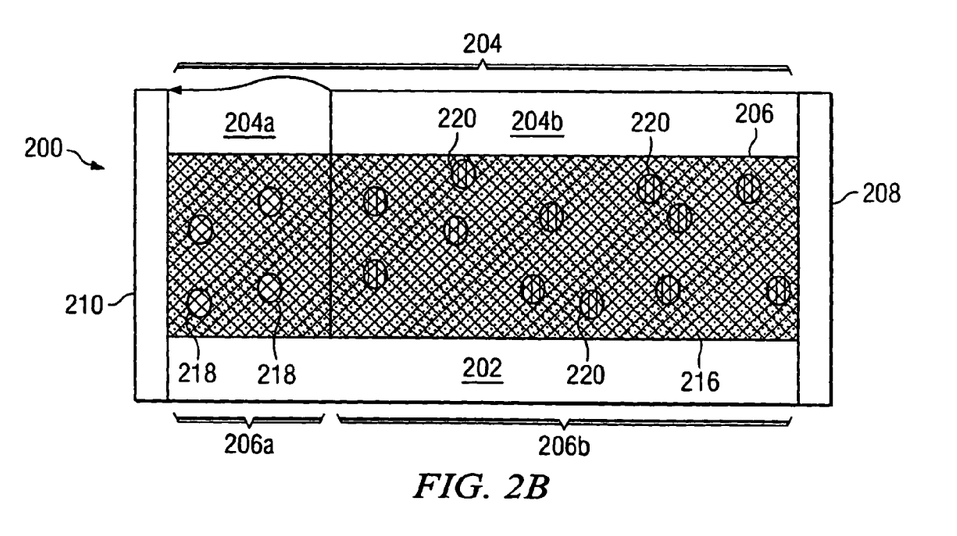
FIG. 2B is a cross-sectional view of the photopolymer holographic medium of FIG. 2A after data has been stored in the medium, and where at least some of monitor elements have been modified and indicate a change in the medium in accordance with the present invention.

FIG. 2B is a cross-sectional view of the photopolymer-based holographic storage medium of FIG. 2A after data has been stored in the medium, and where at least some of the reference elements have been modified and indicate a deleterious change in the medium in accordance with the present invention.

FIG. 2B indicates a point in time after data has been stored in medium 206. Data has been stored in medium 206 as indicated by the transformation of previously uniformly distributed monomer elements 212 into a spatially modulated distribution of photo-polymer products, forming index gratings 216 in holographic recording material 206. In addition to the storage of data, medium 206 has degraded in some way as depicted by FIG. 2B.

This degradation can be detected by measuring the current parameters of each one of agents 214. As depicted in FIG. 2B, a first portion 218 of reactive agents 214 have undergone changes, or otherwise reacted in response to changes to their local environment while a second portion 220 have not reacted with their local environment. Because first portion agents 218 have reacted, this indicates the presence of some type of contaminant or the occurrence of some internal material transformation in first portion 206a of medium 206. Second portion agents 220 have not reacted which indicates the absence of contaminants or of any internal transformation in second portion 206b of medium 206.

As indicated in FIG. 2B, as a result of a contaminant within first portion 206a, first portion 206a has degraded causing swelling of first portion 206a and a deformation of a first portion 204a of second substrate 204. A second portion 204b has not been deformed since second portion 206b does not include a contaminant.

However, internal deleterious transformation of recording material 206 is not necessarily accompanied by a change a visible change in the aspect or conformation of the holographic storage medium 200.

Figure 3A:
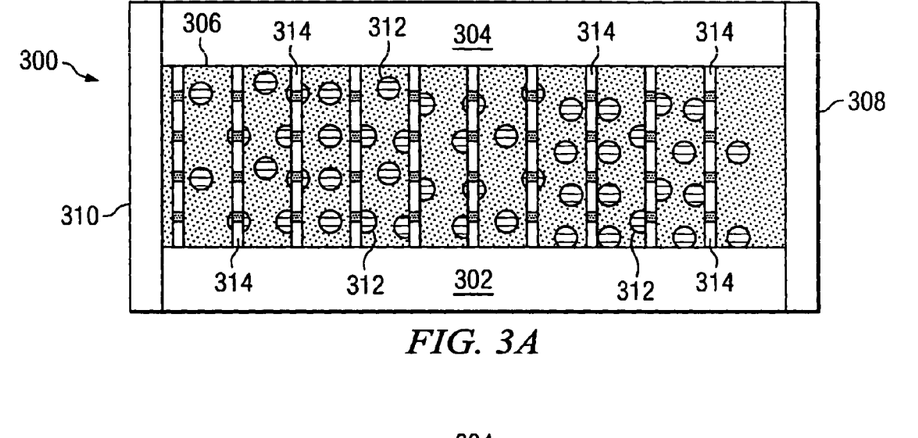
FIG. 3A is a cross-sectional view of a photopolymer holographic medium that includes embedded monitor elements, prior to storing data in the medium, in accordance with a second embodiment of the present invention.
Figure 3B:
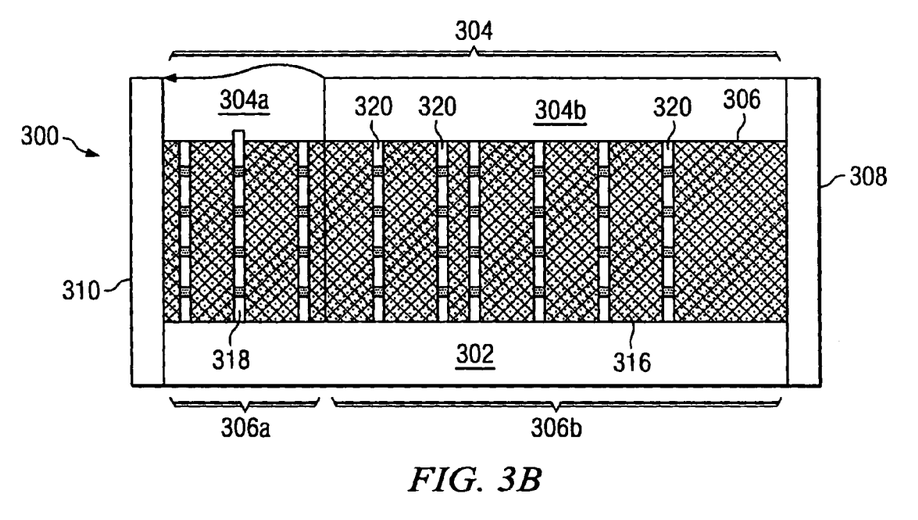
FIG. 3B is a cross-sectional view of the photopolymer holographic medium of FIG. 3A after data has been stored in the medium, and where at least some of the gratings have been detuned and indicate a change in the medium in accordance with the present invention.

FIGS. 3A and 3B illustrate a cross-sectional view of a photopolymer-based holographic storage medium according to another embodiment of the invention. Photopolymer-based holographic storage medium 300 is similar in structure to photopolymer-based holographic storage medium 200 illustrated in FIGS. 2A and 2B, but differing in the method employed for producing monitor agents in the holographic recording material 306

According to this embodiment, a plurality of localized gratings or spatial patterns 314 is recorded within holographic recording material 306 prior to storing information within holographic recording material 306. Gratings 314 are localized in their transverse dimension but extend substantially in their longitudinal direction such that they form thick gratings, and entailing a restricted range of optimal illumination condition dependent upon their periodic properties (i.e., their direction and spatial periodicity). Recorded gratings 314 are sensitive to dimensional changes in holographic recording medium 306, which produce modifications, also termed detuning, of their properties, by virtue of the resulting changes in their spatial periodicity. Recorded gratings 314 therefore act as sensors of dimensional changes in holographic recording material 306 due to the observable changes in the readout signal intensity upon their illumination. Gratings 314 are preferably reflective Bragg grating patterns. Although either reflective or transmissive gratings can be used, reflective patterns are preferred because they are more sensitive to the change in the grating period.

FIG. 3B is a cross-sectional view of the photopolymer-based holographic storage medium 300 of FIG. 3A after data has been stored in the medium, and where at least some of the gratings have been detuned and indicate a change in the medium in accordance with the present invention.

FIG. 3B indicates a point in time after data has been stored in holographic recording material 306. Data has been stored in holographic recording material 306 as indicated by the transformation of monomer elements 312 into gratings 316 in holographic recording material 306. In addition to the storage of data, holographic recording material 306 has degraded in some way as depicted by FIG. 3B.

Medium 300 may experience dimensional changes, such as swelling, due to the presence of contaminants or of the occurrence of an internal material transformation within holographic recording material 306. Substrates 302 and 304 are suitably rigid materials which substantially counteract transverse (i.e., parallel to the surface of substrates 302 and 304) deformations of holographic recording material 306.

In the longitudinal direction (i.e. along the thickness of medium 300), the edge seals 308 and 310 only exert a clamping force on the periphery of the medium 300, and thus do not provide any substantial mechanical clamping force on the surface of medium 300, beyond that provided by the rigidity of the substrates themselves.

Therefore, medium 306 will not deform as much in the direction parallel to than in the direction perpendicular to the surface of substrates 302 and 304.

Over time, moisture can penetrate medium 300 through an edge seal, such as seals 308 or 310, once the edge seal is compromised, which may cause the medium to deform principally in the longitudinal direction perpendicular to its surface. Another source of degradation may comprise an internal transformation occurring in the holographic recording material 306 and producing a dimensional change.

Gratings 314 are used to detect a change in the dimension of medium 306 that is perpendicular to the surface of medium 306.

This degradation can be detected by illuminating each one of gratings 314. As depicted in FIG. 3B, a first portion 318 of gratings 314 has become detuned due to the presence of some contaminant in a first portion 306a of holographic recording material 306. A second portion 320 of gratings 314 have not become detuned because no contaminant is present in second portion 306b of holographic recording material 306.

As a result of a contaminant or of an internal material transformation within first portion 306a, first portion 306a has degraded causing swelling of first portion 306a, a deformation of a first portion 304a of second substrate 304, and damage to seal 310. A second portion 304b has not been deformed since second portion 306b does not include a contaminant.

Gratings 314 are oriented perpendicular to the surface of medium 300. Each one of gratings 314 has a grating period. When holographic recording material 306 swells perpendicularly to the medium's surface, this causes swelling of periodic grating structure which causes a change in the grating period of gratings 318.

Grating detuning due to dimensional changes in holographic recording material 306 can be detected as changes in the reflectivity of one of the gratings 318.

The present invention lends itself to optical recording technologies since the optical properties of the elements may be probed using the drive's existing optical read, write and servo systems or by means of additional apparatuses.

Figure 4:
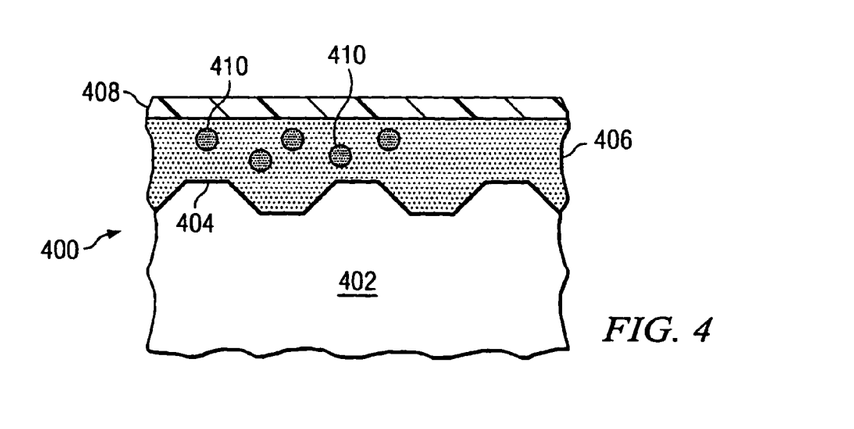
FIG. 4 is a cross-sectional view of an optical storage disk that includes embedded monitor elements in accordance with another embodiment of the present invention.

FIG. 4 is a cross-sectional view of a digital video disk (DVD) 400 that includes embedded reference elements in accordance with another embodiment of the present invention. DVD 400 includes a substrate 402, a recording layer 404 for recording data, a cover layer 406, and a protective coating 408. Reference elements 410 have been embedded into cover layer 406 and may be utilized to track the degradation and performance trends of DVD 400.

These techniques may also be applied to magnetic media such as tape media. One type of tape media may comprise a base film layer or substrate, which is coated with a magnetic film comprised of metal particles encased in a binder material. Major sources of magnetic tape media degradation comprise binder breakdown due primarily to hydrolysis, and metal particle oxidation. In a similar manner, monitoring elements may be embedded into the media whose properties are tuned to the particular chemical composition of the media for detecting the presence of harmful contaminants or products of binder and metal particle breakdown. In one embodiment, monitor elements may form one or more elements added to the composition of the base film or of the magnetic layer and selected such that they are sensitive to products of degradation known to occur within the base film or the magnetic layer. These elements may for example be optically detectable elements which present distinct optical signatures (i.e. a modification in one of their optical properties) characteristic of the presence or absence of binder breakdown.

Figure 5A:
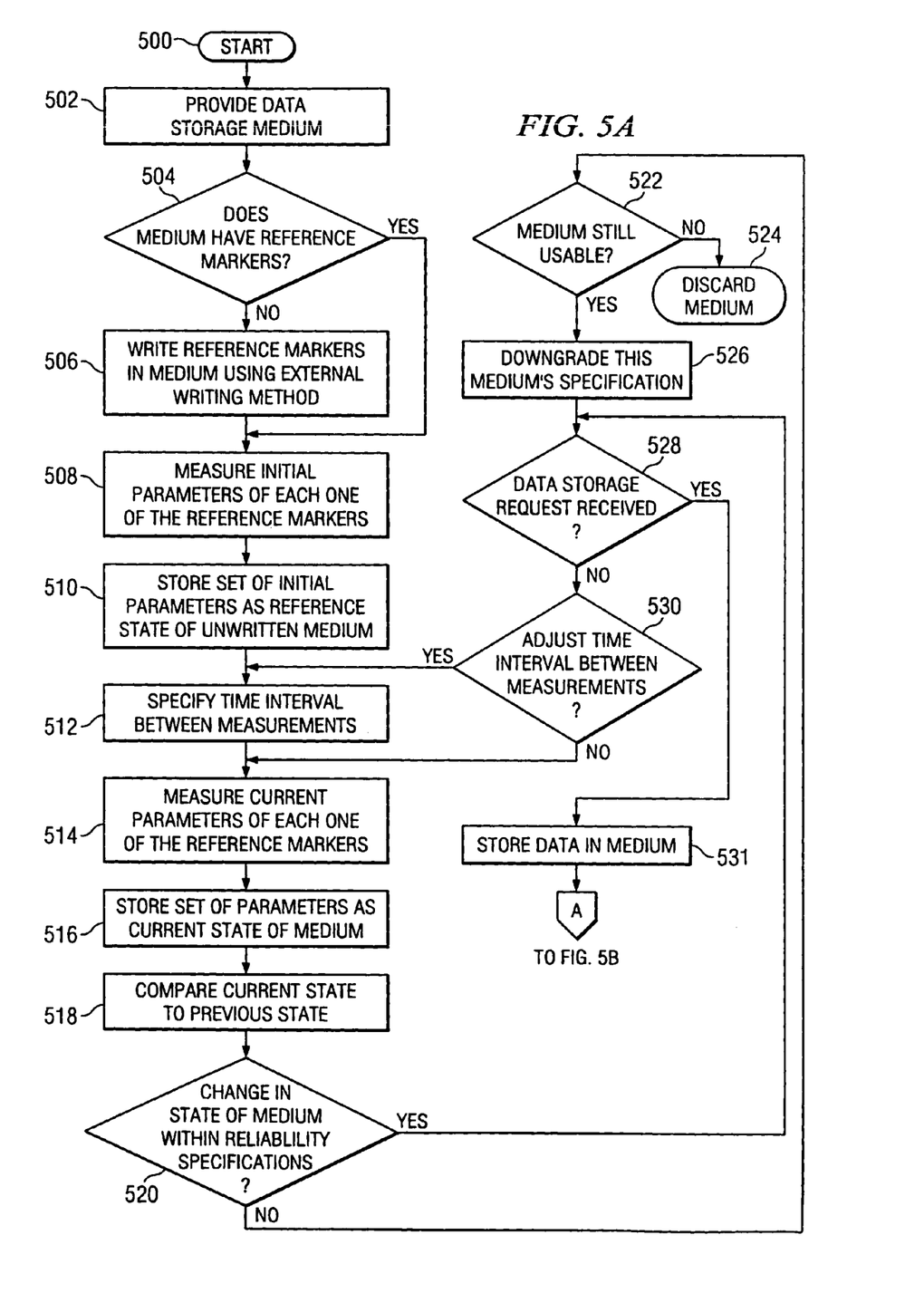
FIGS. 5A through 5B together are a high level flow chart that depicts determining states of a particular medium over time by tracking parameters of monitor elements in the medium in accordance with the illustrative embodiment of the present invention.
Figure 5B:
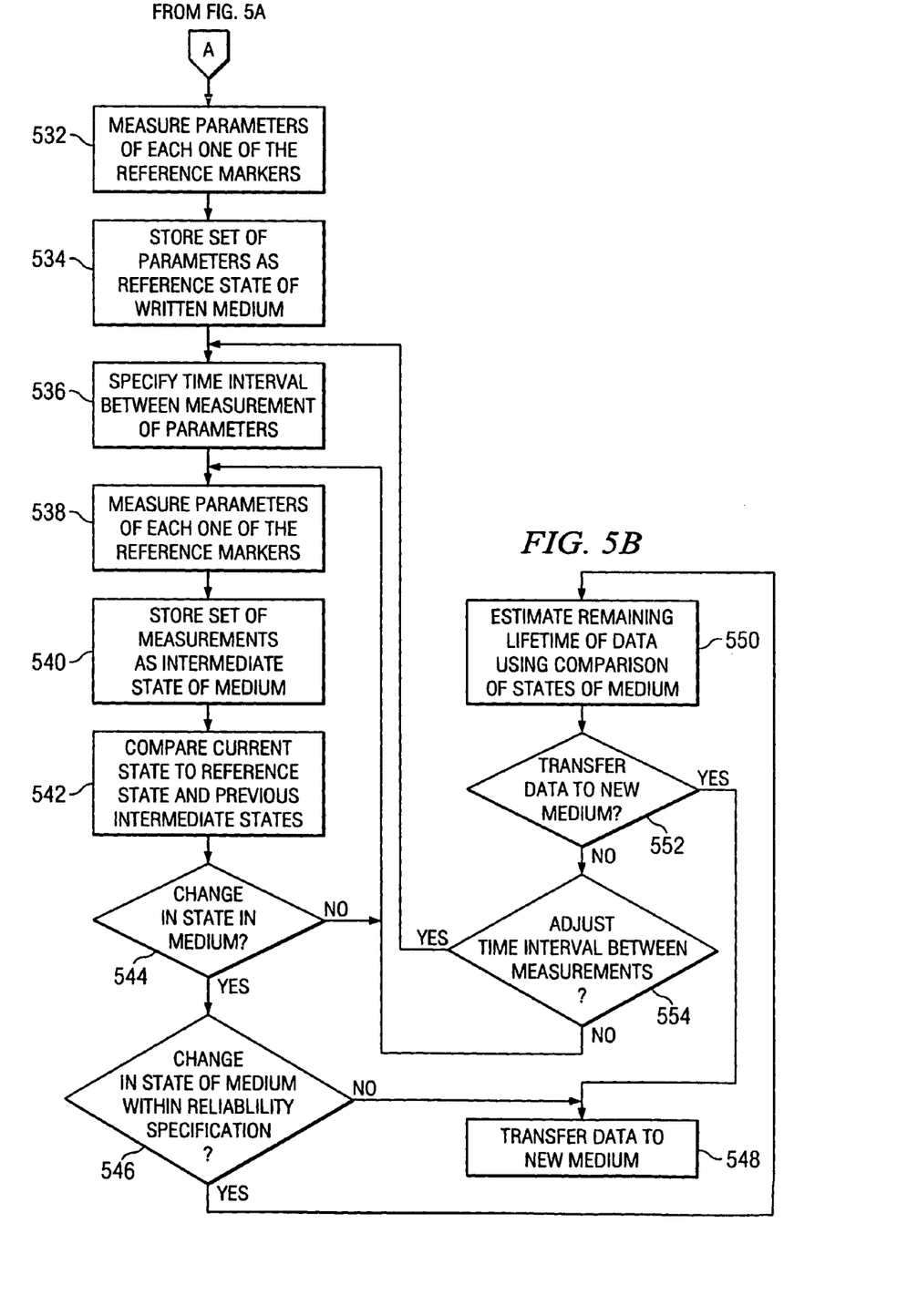

FIGS. 5A through 5B together are a high level flow chart that depicts a process for monitoring a medium and determining its state over time by tracking parameters of reference markers in the medium in accordance with the illustrative embodiment of the present invention. With respect to FIG. 5A, the process starts as depicted by block 500 and thereafter passes to block 502 which illustrates providing a storage medium. Next, block 504 depicts a determination of whether or not the medium already has reference markers written in the medium. If a determination is made that the reference medium does not have reference markers, the process passes to block 506 which illustrates writing reference markers in the medium using an external method. The process then passes to block 508. Referring again to block 504, if a determination is made that the medium already has reference markers, the process passes to block 508.

Block 508, then, depicts measuring the initial parameters of each one of the reference markers. The process then passes to block 510 which illustrates storing the set of initial parameters as a reference state of the unwritten medium. The set includes the initial parameters measured, as depicted by block 508. Thereafter, block 512 illustrates specifying a time interval to use between measurements. Next, block 514 depicts measuring the current parameters of each one of the reference markers.

The process then passes to block 516 which illustrates storing the set of current parameters as the current state of the medium. Thereafter, block 518 depicts comparing the current state to the previous state. Block 520, then, illustrates a determination of whether or not there has been a change in the state of the medium and whether the medium is still within specifications for reliable media. If a determination is made that this medium is still within the specifications for reliable media, the process passes to block 528.

Referring again to block 520, if a determination is made that this medium is no longer within the specifications for reliable media, the process passes to block 522 which depicts a determination of whether or not this medium is still usable. If a determination is made that this medium is no longer usable, this medium is discarded as illustrated by block 524. Referring again to block 522, if a determination is made that this medium is still usable though its reliability and performance may have degraded, the process passes to block 526 which depicts downgrading the specification of this particular medium. The process then passes to block 528.

Block 528, then, illustrates a determination of whether or not a data storage request has been received for storing data in this medium. If a determination is made that no data storage request has been received, the process passes to block 530 which depicts a determination of whether or not to adjust the time interval between measurements. If a determination is made that the time interval between measurements should not be adjusted, the process passes back to block 514. Typically, the determination of not adjusting the time interval is arrived at when the determination of block 520 has determined that the medium remains unchanged. If a determination is made that the time interval between measurements should be adjusted, the process passes back to block 512. Typically, the determination of adjusting the time interval is arrived at when the determination of block 520 has determined that the medium shows a detectable amount of change.

Referring again to block 528, if a determination is made that a data storage requested has been received, the process passes to block 531 which illustrates storing data in the medium. The process then passes to block 532 of FIG. 5B, as depicted through connector A.

FIG. 5B depicts the continuation of the process for monitoring a medium, after data is stored in the medium, as illustrated in block 531. Block 532 illustrates measuring the parameters of each one of the reference markers in the medium. Next, block 534 depicts storing a set of parameters as a reference state of the written medium. Thereafter, block 536 illustrates specifying a time interval to use between the measurements of parameters. The process then passes to block 538 which depicts measuring the current parameters of each one of the reference markers. Then, block 540 depicts storing a set of measurements as an intermediate state of the medium. Next, block 542 illustrates comparing the current intermediate state to the reference state and previous intermediate states.

The process then passes to block 544 which depicts a determination of whether or not there has been a change in the state of the medium. If a determination is made that there has not been a change in the state of the medium, the process repeats the steps depicted in blocks 538 through 544, until a determination is made that there has been a change in the medium, at which point the process passes to block 546 which illustrates a determination of whether or not the change in the state of the medium is within the reliability specification for the medium. If a determination is made that the change in the state of the medium is not within the reliability specification, the process passes to block 548 which depicts transferring the data that is stored on the medium to a new medium.

Referring again to block 546, if a determination is made that the change in the state of the medium is within the reliability specification, the process passes to block 550 which illustrates estimating the remaining lifetime of the data using a comparison of the states of the medium. Next, block 552 depicts a determination of whether or not the data should be transferred to a new medium. Typically, determination of block 552 may be made based on a combination of factors including the estimation of remaining data lifetime established at step 520, as well as system resources availability in terms of storage media capacity and drive utilization. If a determination is made that the data should be transferred to a new medium, the process passes to block 548.

Referring again to block 552, if a determination is made that the data should not be transferred to a new medium, the process passes to block 554 which depicts a determination of whether or not to adjust the time interval between measurements. If a determination is made to adjust the time interval, the process passes to block 536. If a determination is made that the time interval should not be adjusted, the process passes to block 538.

Figure 6:
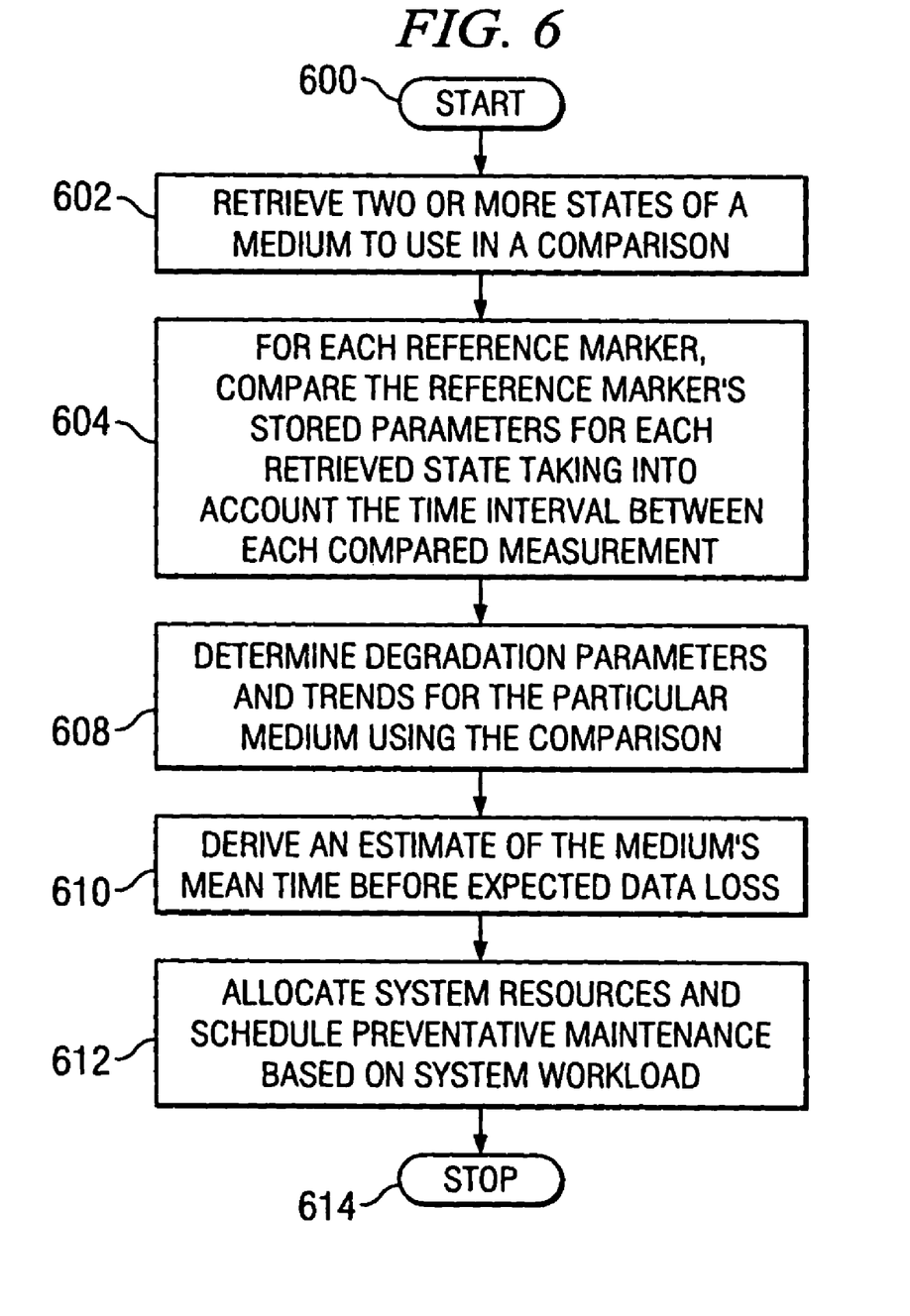
FIG. 6 illustrates a high level flow chart that depicts monitoring the reliability of a medium utilizing determined states of the medium in accordance with the illustrative embodiment of the preferred invention.

FIG. 6 illustrates a high level flow chart that depicts the process for monitoring the reliability of a medium by utilizing determined states of the medium in accordance with the illustrative embodiment of the preferred invention. The process starts as depicted by block 600 and thereafter passes to block 602 which illustrates retrieving two or more states of a medium to use in a comparison. Next, block 604 depicts for each reference marker in the medium, comparing the reference marker's stored parameters for each retrieved state taking into account the time interval between each compared measurement.

The process then passes to block 608 which illustrates determining degradation parameters and trends for the particular medium using the comparison. Next, block 610 depicts deriving an estimate of the medium's mean time before data loss is expected to occur. Thereafter, block 612 illustrates allocating system resources and scheduling preventative maintenance based on the system workload. The process then terminates as depicted by block 614.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring the degradation of a data storage medium having a data recording material within said medium, comprising:

providing a plurality of monitor elements arranged within said medium, each of said monitor elements having an optical property sensitive to at least one of the presence of a contaminant within said medium adjacent to said monitor element and a deformation of said medium adjacent to said monitor element;

performing a first measurement of the optical property of at least one of said plurality of monitor elements to generate a map of an initial state of said medium;

performing at least one second measurement at a subsequent point in time of the optical property of said at least one of said plurality of monitor elements to generate a map of an intermediate state of said medium; and after each at least one second measurement, determining whether said medium has degraded as a result of either having been contaminated or deformed by comparing said map of said initial state to said map of said intermediate state to detect any changes in said optical property of said at least one of said plurality of monitor elements, wherein said medium is determined to have degraded if said optical property of said at least one of said plurality of monitor elements has changed.

2. The method according to claim 1, further comprising:

after performing said first measurement, storing results of said first measurement on at least one of said medium being monitored and of a different storage device; and after performing said at least one second measurement, storing results of said at least one second measurement on at least one of said medium being monitored and of a different storage device.

3. The method according to claim 1, further comprising:

recording data to the data storage medium, wherein the step of recording data occurs prior to the steps of performing said first, performing at least one second measurements, and determining whether said medium has degraded.

4. The method according to claim 1, further comprising:

recording data to the data storage medium, wherein the step of recording data occurs subsequent to the steps of performing said first, performing at least one second measurements, and determining whether said medium has degraded.

5. The method according to claim 1, wherein at least one of the plurality of monitor elements react to the presence of a contaminant within said medium adjacent to at least one of said plurality of monitor elements, and wherein said optical property of said at least one of said plurality of monitor elements is changed after said reaction.

6. The method according to claim 1, wherein the optical property of monitor elements being measured comprises one of its fluorescence and absorption properties, and wherein the detectable change comprises at least one of a change in the wavelength and in the intensity of maximum emission or absorption.

7. The method according to claim 1, further comprising:

detecting a change in a dimension of said medium by measuring the relative position of at least one of said plurality of monitor elements.

8. The method according to claim 1, further comprising:

said monitor elements including a species of elements that is different from a recording species that forms the recording material, wherein said plurality of monitor elements do not interact with the recording species.

9. The method according to claim 1, wherein said step of providing a plurality of monitor elements further comprises providing a plurality of patterns, wherein said patterns are optically written into said medium.

10. The method according to claim 1, further comprising:
specifying a time interval to wait between subsequent measurements of said optical property of said at least one of said plurality of monitoring elements;
performing at said specified time intervals additional measurements of said optical property of said at least one of said plurality of monitor elements to generate a map of additional intermediate states of said medium at said time intervals; and
after each additional measurement, determining whether said medium has degraded as a result of either having been contaminated or deformed by comparing said map of said initial state to said map of said additional intermediate state to detect any changes in said optical property of said at least one of said plurality of monitor elements.

11. The method according to claim 10, further comprising:
comparing said map of said initial state to at least one of the at least one said maps of said additional intermediate states;
utilizing said comparison of said map of said initial state to at least one of the at least one said maps of said additional intermediate states to determine degradation parameters and remaining functional lifetime of said medium.

12. The method according to claim 11, further comprising:
in response to said determination of degradation parameters and remaining lifetime of recorded data on said medium, preventing data loss by adjusting said time interval between measurements of said medium.

13. The method according to claim 11, further comprising:
in response to said determination of degradation parameters and remaining lifetime of recorded data on said medium, preventing data loss by transferring recorded data from said degraded medium for recording to a new data storage medium.

14. The method according to claim 1, wherein the data storage medium is one of an optical and holographic type.

15. The method according to claim 1, wherein the data storage medium is a magnetic tape, and further comprising:
locating said plurality of monitor elements in the substrate or the magnetic layer.

16. The method according to claim 1 wherein performing the first measurement of the optical property of said at least one of said plurality of monitor elements is done by illuminating said at least one of said plurality of monitor elements with light having a given wavelength and performing the second measurement of the optical property of said at least one of said plurality of monitor elements is done by illuminating said at least one of said plurality of monitor elements with light having the same wavelength.

17. A method for monitoring the degradation of a data storage medium, the method comprising:
providing within the medium a monitor element having an optical property sensitive to degradation of the medium;
measuring the optical property of the monitor element at a first time;
measuring the optical property of the monitor element at a second time subsequent to the first time;
comparing the optical property of the monitor element at the first time with the optical property of the monitor element at the second time; and
determining that the medium has degraded if the optical property of the monitor element has changed from the first time to the second time.

18. The method of claim 17 wherein:
degradation of the medium occurs as a result of the medium being contaminated.

19. The method of claim 17 wherein:
degradation of the medium occurs as a result of the medium deforming.

20. The method of claim 17 wherein:
measuring the optical property of the monitor element at the first and second times includes illuminating the monitor element with light having the same wavelength.

* * * * *

UNITED STATES PATENT AND TRADEMARK OFFICE
CERTIFICATE OF CORRECTION

PATENT NO.       : 7,636,171 B1                                          Page 1 of 1
APPLICATION NO. : 11/409781
DATED            : December 22, 2009
INVENTOR(S)      : Sigel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 912 days.

Signed and Sealed this

Twenty-first Day of December, 2010

David J. Kappos
*Director of the United States Patent and Trademark Office*